United States Patent [19]

Schafroth

[11] Patent Number: 5,012,993

[45] Date of Patent: May 7, 1991

[54] GLIDING PARACHUTE

[76] Inventor: Konrad Schafroth, Wart 52, 3600 Thun, Switzerland

[21] Appl. No.: 337,626

[22] Filed: Apr. 10, 1989

[30] Foreign Application Priority Data

Apr. 8, 1988 [CH] Switzerland .................. 1293/88

[51] Int. Cl.⁵ ............................................. B64D 17/18
[52] U.S. Cl. .................................. 244/145; 244/142
[58] Field of Search .............. 244/142, 145, 153 R, 244/902

[56] References Cited

U.S. PATENT DOCUMENTS

| Re. 31,205 | 4/1983 | Jalbert | 244/145 |
| 3,944,169 | 3/1976 | Bede | 244/142 |
| 4,129,272 | 12/1978 | Jones et al. | 244/153 R |
| 4,363,458 | 12/1982 | Jones et al. | 244/153 R |
| 4,406,433 | 9/1983 | Radkey et al. | 244/145 |
| 4,811,920 | 3/1989 | Askwith et al. | 244/145 |

FOREIGN PATENT DOCUMENTS 2310258 12/1976 France ......................... 244/902

Primary Examiner—Sherman Basinger
Assistant Examiner—Anne E. Bidwell

[57] ABSTRACT

The gliding parachute which is closed at its leading edge comprises substantially in the zone of the highest aerodynamic impact pressure pressurizing air entry openings located in the lower parachute sheet, which openings lead to a stabilizing of the shape of the parachute comprising substantially an upper and a lower parachute sheet forming an air foil structure. In order to inflate this parachute during the starting phase, inflating air entry openings are located downstream of the pressurizing air entry openings, which inflating air openings are designed as check valves. This causes a faster and safer filling of the interior of the parachute by air.

11 Claims, 1 Drawing Sheet

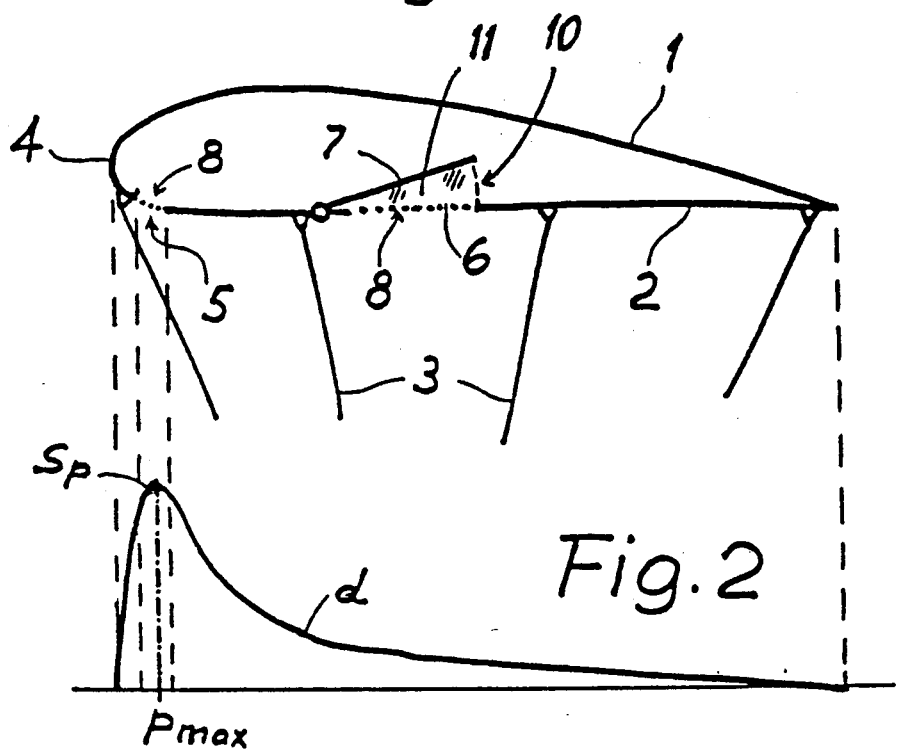
Fig. 1
Fig. 2
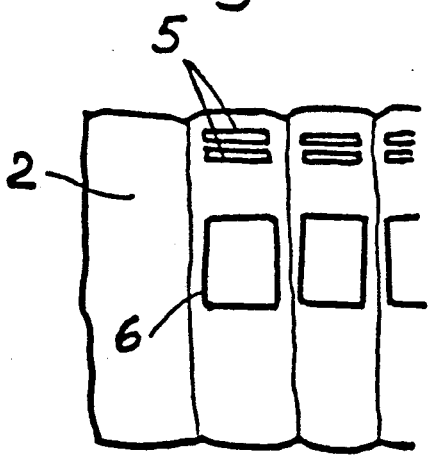
Fig. 3
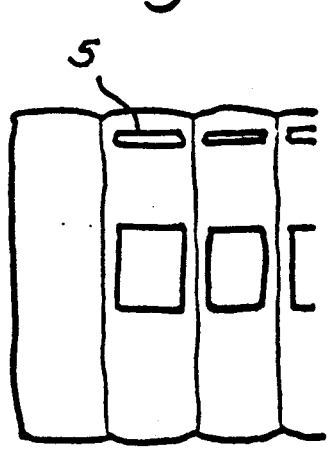
Fig. 4
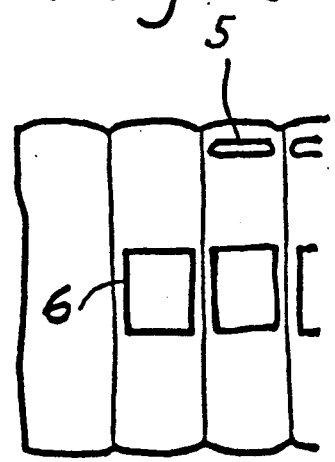
Fig. 5

GLIDING PARACHUTE

BACKGROUND OF THE INVENTION

1. Field of the Invention

The present invention relates to a gliding parachute made of flexible materials and having an upper and a lower parachute sheet, which parachute is inflatable by air flowing thereagainst to an air foil shape, of which the upper and lower parachute sheets form an air foil structure which is closed at its leading edge.

Such gliding parachutes or parachutes for parascending, respectively, can be used for the common jumping out of an airplane but find specific use in the ground running start operation on mountains or hills or also for a starting by means of a winch. During the starting phase such gliding parachutes which are composed of flexible materials, such as of air impermeable webs of woven materials, are inflated to the shape of a supporting body by the air flow flowing thereagainst.

2. Description of the Prior Art

In order to pressurize and to inflate the gliding parachute during the starting phase within a short time span, generally known gliding parachutes, such as disclosed, for instance, in the published German patent application DE-OS No. 37 07 463, have an open leading edge through which air streams rapidly into the inner space of the air foil profile structure. It is generally known that such gliding parachutes feature a relatively high resistance and a relatively poor angle of descent.

Accordingly, attempts were made to locate the pressurizing openings away from the leading edge, i.e. to close the front side of the profile completely off. When such gliding parachute is in its inflated state, sort of an air foil wing is formed having an upper parachute sheet and a lower parachute sheet and a completely closed leading wing edge.

Such an air flow wing generates in its inflated condition a considerable lift and features a considerably flatter angle of descent.

A problem encountered during the use of a gliding parachute designed as set forth above is that the parachute is oftentimes not filled rapidly and suffiently safely with air during the start, which obviously detrimentally influences the starting procedure or even prevents a starting at all.

SUMMARY OF THE INVENTION

It is, therefore, a general object of the present invention to provide a gliding parachute which inflates within a short time span safely into a stable air foil wing profile shape and features simultaneously a optimal angle of descent.

A further object is to provide a gliding parachute, in which the lower parachute sheet comprises thus at a zone of the highest aerodynamic impact pressure an air entry opening means for pressurizing the air foil structure, and downstream thereof an air entry opening means for inflating the air foil structure, which inflating air entry opening means is provided with a check valve member.

By means of the inflating air openings of the gliding parachute structured in accordance with the present invention a large volume flows during the starting phase immediately into the parachute and inflates the parachute safely and with a large security to the necessary air foil wing shape. By means of the aerodynamic impact pressure air flowing from the front through the impact pressure air entry openings into the air foil wing structure the check valves located at the inflating air entry openings are closed immediately. Thereafter, the aerodynamic impact pressure air openings serve only to maintain the pressure within the gliding parachute structure. For this reason they are termed also "pressure air entry openings".

BRIEF DESCRIPTION OF THE DRAWINGS

The present invention will be better understood and objects other than those set forth above will become apparent when consideration is given to the following detailed description thereof. Such description makes reference to the annexed drawings, wherein:

FIG. 1 illustrates a section extending perpendicularly to the direction of flight through a gliding parachute structured in accordance with the present invention;

FIG. 2 illustrates a corresponding diagram illustrating the extent of the aerodynamic pressure curve depicting the pressure at the lower surface of the parachute; and FIG. 3 illustrates various arrangements of the aerodynamic impact pressure air entry openings and the inflating air entry openings at the lower side of the parachute.

DESCRIPTION OF THE PREFERRED EMBODIMENTS

The embodiment of the invention illustrated in FIG. 1 in its inflated condition as a profile in shape of an air foil wing having an upper parachute sheet 1 and a lower parachute sheet 2, both made of an air impermeable weaving and, furthermore, having load bearing lines 3. In its flying condition the gliding parachute displays an air foil having a closed leading wing edge 4.

In order to get filled by air during the start phase the gliding parachute comprises in its lower sheet 2 in the zone of the largest aerodynamic impact pressure one or a plurality of pressurizing air entry openings distributed over its wingspread. FIG. 2 illustrates a plotting of the pressure curve d of this gliding parachute during its gliding flight. As can clearly be seen, the largest pressure Sp max exists at the impact pressure zone of the air foil. The pressurizing air entry openings 5 are located at the general area of mentioned zone.

The pressurizing air entry openings 5 can have a rectangular or elliptical shape. They are designed preferably narrow relative to the direction of flight such to utilize maximally the relatively narrow impact peak pressure Sp such to disturb the profile shape as little as possible.

Downstream of mentioned zone of the highest aerodynamic impact pressure considerably larger inflating air entry openings 6 are provided in accordance with the present invention. These inflating air entry openings 6 are structur-ed or provided with respectively check valve members in form of flaps 7 pivotably mounted to the leading edge of the inflating air entry openings and made also of an air impermeable material. These check valve members close automatically as soon as the parachute has been inflated, which closing is caused by the aerodynamic impact air pressure acting from the front to the rear of the parachute. When these valve members are closed, the entire air foil is a closed structure with the exeption of above mentioned pressurizing air entry openings 5.

The flaps 7 made of an air impermeable material are connected at the trailing edge preferably by means of lines 10 to the lower parachute sheet 2 and are provided, furthermore, with lateral flares 11 extending from the two lateral sides of the flap 7 down to the lower sheet 2 and connected thereto such that the flaps 7 in their open position are positively positioned over the respective inflating air entry opening 6.

Because the edges of the pressurizing air entry openings 5 and specifically their trailing edge may deform towards the outside or inside relative to the air foil structure during the starting phase due to the under certain conditions quickly changing direction of the air flowing thereagainst, which deforming or deflecting, respectively, could additionally detrimentally influence a correct operating of these entry openings 5, it is advantageous to bridge or cover, respectively, these pressurizing air entry openings 5 by a netting which is capable to transmit tension forces at least in the direction of flight of the parachute. As illustrated in FIG. 1, a corresponding network 8 made of a flexible material is also located at the inflating air entry openings 6, which netting also can transmit tension forces acting at least in the direction of flight such that specifically these inflating air entry openings 6 can be dimensioned correspondingly larger and such that a deforming of the edges towards the inside or outside of the profile structure may be prevented. This can additionally accelerate the inflating of the gliding parachute. Of specific importance is, however, to have such a netting present at the pressurizing air entry openings 5 because when during the start phase the edges of these air entry openings deform, the profile of the gliding parachute may be changed and the point of impact of the aerodynamic impact pressure shift.

FIGS. 3, 4, and 5 illustrate various possible arrangments or locations, respectively, of the pressurizing air entry openings 5 and filling air entry openings 6 at or in, respectively, the lower sheet of the gliding parachute. These individual openings may be distributed arbitrarily over the wingspan of the parachute, preferably however, all inflating air entry openings 6 are located downstream of the pressurizing air entry openings. The pressurizing air entry openings 5 may be present arranged along several lines extending in the direction of the wingspan.

The gliding parachute as disclosed features by means of its substantially closed profile shape excellent flying properties and guarantees at the same time due to its inflating air entry openings 6 which are designed as check valves a starting phase without any difficulties. In summary, the flight safety properties are considerably increased.

While there are shown and described present preferred embodiments of the invention, it is to be distinctly understood that the invention is not limited thereto, but may be otherwise variously embodied and practiced within the scope of the following claims.

I claim:

1. A gliding parachute in the configuration of an airfoil structure, having an upper and a lower sheet of flexible material and a closed leading edge, defining together at least an inflatable airfoil chamber, the airfoil structure having an outside aerodynamic pressure distribution during flight conditions, the pressure distribution having a zone of maximum aerodynamic pressure located between the closed leading edge and the lower sheet, the airfoil structure comprising:
   a first opening between the leading edge of the lower sheet and located in the zone of maximum aerodynamic pressure, said first opening remaining opened during flight to maintain a pressure communication between the outside aerodynamic pressure distribution and the airfoil chamber; and
   a second opening located downstream from said first opening in the lower sheet and being substantially larger than said first opening, said second opening including a check valve member to keep said second opening opened while the airfoil structure is inflating and closing said second opening after the airfoil structure is fully inflated.

2. The gliding parachute defined in claim 1 wherein said first opening includes a plurality of discrete openings distributed over the wingspread of the airfoil structure.

3. The gliding parachute of claim 2 wherein the plurality of discrete openings of said first opening are narrow in the direction of flight and are located in the zone of maximum aerodynamic pressure.

4. The gliding parachute defined in claim 2 wherein said second opening includes a plurality of discrete openings distributed over the wingspread of the airfoil structure.

5. The gliding parachute defined in claim 4 wherein the plurality of discrete openings of said first opening are arranged aligned in at least one row extending in the direction of the wingspread of the airfoil structure.

6. The gliding parachute of claim 4, wherein the plurality of discrete openings of said second opening comprise a surface area larger than the surface area of the plurality of discrete openings of said first opening.

7. The gliding parachute of claim 4, wherein said check valve member includes a flap of an air impermeable weaving hingedly mounted at the leading edge of the respective openings of said second opening and pivotable into the chamber of the airfoil structure so that during the inflation phase the openings of said second opening are in an open position.

8. The gliding parachute of claim 4, wherein the plurality of discrete openings of said first opening and the plurality of discrete openings of said second opening are distributed over the wingspread of the airfoil structure, wherein every first opening is trailed by a second opening.

9. The gliding parachute defined in claim 1 wherein said first opening includes a netting capable of transmitting tension forces acting in the direction of flight and remains opened during flight.

10. The gliding parachute defined in claim 1 wherein said second opening includes a netting capable of transmitting tension forces acting in the direction of flight, said second opening being closed after inflation by said check valve member.

11. The gliding parachute of claim 1, wherein said second opening is located at the lower parachute sheet in a zone subject in flight to a considerably lower aerodynamic pressure than the zone of said first opening.

* * * * *